United States Patent
Agarwal et al.

(10) Patent No.: US 11,307,867 B2
(45) Date of Patent: Apr. 19, 2022

(54) OPTIMIZING THE STARTUP SPEED OF A MODULAR SYSTEM USING MACHINE LEARNING

(71) Applicant: Adobe Inc., San Jose, CA (US)

(72) Inventors: Nitika Agarwal, Delhi (IN); Carsten Ziegeler, Paderborn (DE); Allaert Joachim David Bosschaert, Balbriggan (IE)

(73) Assignee: ADOBE INC., San Jose, CA (US)

( * ) Notice: Subject to any disclaimer, the term of this patent is extended or adjusted under 35 U.S.C. 154(b) by 455 days.

(21) Appl. No.: 16/537,809

(22) Filed: Aug. 12, 2019

(65) Prior Publication Data
US 2021/0049019 A1    Feb. 18, 2021

(51) Int. Cl.
| | | |
|---|---|---|
| *G06F 9/00* | (2006.01) | |
| *G06F 9/4401* | (2018.01) | |
| *G06F 16/901* | (2019.01) | |
| *G06N 20/00* | (2019.01) | |

(52) U.S. Cl.
CPC ........ *G06F 9/4401* (2013.01); *G06F 16/9024* (2019.01); *G06N 20/00* (2019.01); *G06F 9/4406* (2013.01)

(58) Field of Classification Search
CPC .... G06F 9/4401; G06F 16/9024; G06N 20/00
See application file for complete search history.

(56) References Cited

U.S. PATENT DOCUMENTS

| | | | | |
|---|---|---|---|---|
| 5,853,631 | A  * | 12/1998 | Linehan ................. | B29C 45/78 264/40.6 |
| 8,161,275 | B1 * | 4/2012 | Woodward ........... | H04N 21/426 713/1 |
| 11,138,518 | B1 * | 10/2021 | Yu ....................... | G06F 9/44526 |
| 2015/0012147 | A1 * | 1/2015 | Haghighat-Kashani | ..................... G06Q 50/06 700/291 |
| 2016/0363985 | A1 * | 12/2016 | Ehmann ................. | G06F 13/37 |
| 2017/0097748 | A1 * | 4/2017 | Wernick ................. | G06F 3/017 |

(Continued)

OTHER PUBLICATIONS

Wikipedia, "Crossover", downloaded from https://en.wikipedia.org/wiki/Crossover_(genetic_algorithm), Jun. 14, 2019, 3 pages.

(Continued)

*Primary Examiner* — Volvick Derose
(74) *Attorney, Agent, or Firm* — F. Chau & Associates, LLC

(57) ABSTRACT

Systems and methods use machine learning to find an efficient startup sequence for the components of an application. An example method includes receiving the plurality of components of the modular system and a mechanism for launching the modular system and invoking a machine-learning ordering tool to generate at least one startup sequence. The at least one startup sequence may be returned with corresponding launch metrics. The method may also include determining, based on launch metrics for the at least one startup sequence, whether an efficient sequence has been identified. Responsive to the efficient sequence being identified, the operations can include returning the efficient startup sequence, wherein the modular system is launched using the efficient startup sequence. Responsive to failing to identify the efficient sequence, the operations can include repeating the invoking and determining.

20 Claims, 5 Drawing Sheets

(56) References Cited

U.S. PATENT DOCUMENTS

2017/0139816 A1* 5/2017 Sapozhnikov ............ G06F 8/60
2017/0289292 A1* 10/2017 Arning .................... H04L 67/42
2018/0046926 A1* 2/2018 Achin .................... G06Q 10/04
2018/0060744 A1* 3/2018 Achin ...................... G06N 5/02
2018/0069662 A1* 3/2018 Sugaya ................. H04W 28/04

OTHER PUBLICATIONS

Boender, Ferry, "Dependency Resolving Algorithm", downloaded from https://www.electricmonk.nl/docs/dependency_resolving_algorithm/dependency_resolving_algorithm.html, Dec. 31, 2018, 10 pages.

Shelajev, Oleg, "Your Maven build is slow. Speed it up!", downloaded from https://jrebel.com/rebellabs/your-maven-build-is-slow-speed-it-up/, Aug. 11, 2015, 11 pages.

Shodhganga, "Chapter 9, Crossover", downloaded from http://shodhganga.inflibnet.ac.in/oitstream/10603/32680/19/19_chapter%209.pdf, retrieved on Aug. 8, 2019, 18 pages.

Visual CPP DEV Labs, "Solution Dependency Viewer—Visual Studio Marketplace", downloaded from https://marketplace.visualstudio.com/items?itemName=VisualCppDevLabs.SolutionDependencyViewer, retrieved on Aug. 8, 2019, 2 pages.

* cited by examiner

OPTIMIZING THE STARTUP SPEED OF A MODULAR SYSTEM USING MACHINE LEARNING

TECHNICAL FIELD

This description relates to improving the startup speed of a modular system. More specifically, the description relates to using machine learning techniques to identify an efficient order of starting components in a modular system to reduce startup time.

BACKGROUND

Complex modular systems include applications composed of a large number of components. For example, a modular system, i.e., a modular application, may employ hundreds of individual components. To bring such a system into a running state, relevant components need to be started. Most of these systems are designed in such a way that it is possible to start the components in any order. Most modular systems often use a hand-curated start order. Some of these components have dependencies. For example, component A can have a dependency on component B and if A is started before B is available (loaded, in a running state, etc.), A may enter a dormant state. If this occurs, A is started properly once B becomes available.

SUMMARY

Implementations include a system that discovers an efficient startup sequence for components of a large modular system. Starting components in an efficient sequence, e.g., in a near optimal sequence, can significantly reduce the startup time of a modular system, for example reducing the startup time from several minutes to a few seconds. Such sequences minimize components that enter a dormant state during startup, e.g., due to a dependent component that has not yet started. A component entering the dormant state may introduce inefficiencies and slow down the startup speed of the system, so efficient sequences minimize components that enter a dormant state as part of reducing the startup time. Cloud and container-based environments especially benefit from such gains in startup time because modular applications may be dynamically relocated between hosts in such environments and longer startup times can impact users or even cause down time. Implementations take as input information about the modules to be started and about a mechanism for launching the modules. Implementations apply one or more techniques, such as genetic algorithms, neural networks, or heuristic searches (e.g., beam search, alpha-beta search), to identify a startup sequence for the components and provide that startup sequence to the requesting process. Implementations evaluate potential startup sequences using a launch metric. The launch metric may include information from which a startup time for the startup sequence can be determined and may also include a ready time for each component during startup. Implementations provide, in some embodiments, a startup sequence once an optimization criterion is met. Thus, an efficient startup sequence need not be the best possible startup sequence, but instead meets a predefined optimization criterion.

The details of one or more implementations are set forth in the accompanying drawings and the description below. Other features will be apparent from the description and drawings, and from the claims.

DETAILED DESCRIPTION

Figure 1:
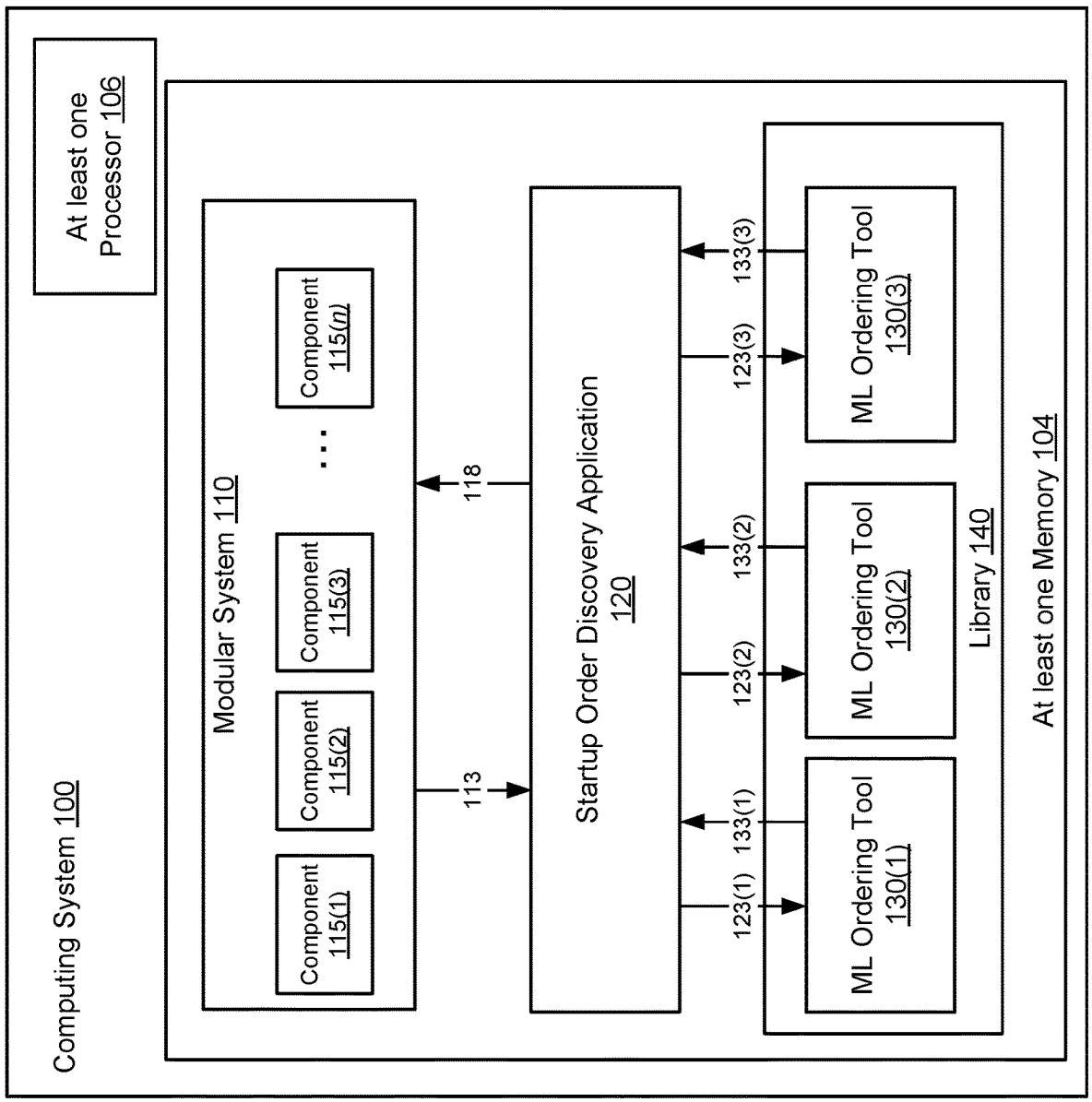
FIG. 1 is a block diagram of a computing system that identifies an efficient startup sequence for components of a modular system, according to an implementation.

Implementations address the problem of minimizing the startup speed of a modular system. Startup speed has an impact on users and may cause downtime when the modular system is relocated between hosts in a cluster if the system takes too much time to begin performing its operations, i.e., the start time is too long. Slow start time may be caused when a component has a dependency on one or more other components and must be put in a delay state until those components are available. Such dependencies may not be obvious and can change often due to the dynamic nature of a modular system. Implementations reduce the startup time of a modular system that comprises a large number of components by identifying a startup sequence for the components. Identifying an efficient startup sequence can decrease the startup speed from minutes to seconds, which is especially important to cloud and container-based environments, where modular applications can be dynamically relocated between hosts and must be re-launched at the new host. When a modular system has a few (e.g., five or possibly seven) components, determining an efficient order may be possible via hand curation. But a modular system with n components has n! possible startup sequences and where n is 10 or more hand curation becomes impractical if not impossible. For a modular system with 500+ components, manually investigating these many alternatives is computationally infeasible owing to the requirement of huge amount of computation resources and time. Moreover, even when a startup sequence is determined manually it may quickly become outdated in a large, dynamic system.

As used herein, a startup sequence is an order in which components are launched. Components may not become available (successfully loaded, initialized and in a ready state) in the order they are launched because of dependencies. A dependency may result from one component needing a second component to launch before it can successfully start. A dependency may result from one component needing a condition to exist before it can successfully initialize itself. For example, one component may require a certain database be available before it can proceed. As another example, one component may require that a certain configuration be present before it can proceed. Thus, a dependency is any condition that prevents a component from completing a launch, or in other words loading and being in a ready state. If a component cannot continue launching it may enter a dormant state.

As used herein, loading a component refers to loading a component into memory. As used herein, launching a component starts execution of the component, but the component is not fully launched, or in other words is not in a ready state, until all startup tasks have completed. As used herein ready time is the time at which a component is in the ready state, i.e., all startup tasks have completed and the component is ready to serve. Startup time is the time it takes for a component to be loaded, dependencies met, initialized and ready (fully running). Thus, a component's ready time (time at which the component is in a ready state) often occurs after its launch time (time at which the component begins its startup tasks). If a component is dependent upon another component, the ready time can occur much later than launch time, depending on when the dependency condition is met.

Implementations may receive an indication of the components to be included in the efficient startup sequence and an indication of a mechanism for launching the components. In some implementations, the indications may be provided by a requesting process. In some implementations, an initial startup sequence may also be received. This initial startup sequence can be provided as a starting place or seed for the machine learning technique(s).

Machine learning techniques rely on patterns and inference to perform a task without explicit instructions to get the task done. In other words, machine learning techniques learn from experience (past inferences) to improve future inferences based on a performance measure. As used herein, a machine learning ordering tool uses a machine learning technique to determine an efficient startup sequence using past experience and domain knowledge to inform inferences about the sequence. The informed inferences enable machine learning ordering tools to arrive at an efficient sequence without having to evaluate every possible sequence.

Implementations may use one or more of machine learning ordering tools to determine an efficient startup sequence. For example, some implementations may use a genetic algorithm based ordering tool to determine an efficient sequence. Some implementations may use a heuristic-based search to determine an efficient sequence. Some implementations may use a neural network to determine an efficient sequence. The machine learning ordering tools may stop looking for an efficient startup sequence once a startup sequence is identified that meets an optimization criterion or criteria. As used herein, an optimization criterion is any condition that a startup sequence must satisfy to be considered as an efficient startup sequence. Put another way, an optimization criterion indicates that the machine learning technique has reached convergence. An example of an optimization criterion is a startup time that is a predetermined time or less, e.g., two seconds or less. Another example of an optimization criterion is a startup time for a sequence that is within some threshold of a previously identified fastest startup time. Other similar conditions may be used to identify an efficient startup sequence.

As used herein, a genetic algorithm is a type of machine learning technique that generates successor hypothesis by repeatedly mutating and recombining part of the best currently known hypotheses. Each hypothesis is referred to as an individual. As used herein, a genetic algorithm based ordering tool is one of the machine learning ordering tools that identifies an efficient startup sequence. As used herein, an individual is a particular startup sequence. A population is a collection of individuals. Thus, as used herein, a population is a set of different startup sequences. Put another way, each population is a collection of hypotheses. At each step, a current population is updated by replacing some fraction of the population by offspring of the most fit current individuals. Fitness is measured using a fitness metric. Implementations use a fitness metric based on the startup speed of an individual. Some implementations may select some percentage of the most fit individuals in the current population for the next population. Some implementations may generate offspring for the new population by applying a crossover operation to individuals in the current population. In some implementations, the system may mutate some of the individuals in the new population, e.g., by swapping the position of one or more components in the startup sequence. Implementations measure the fitness of an individual in the new population by launching the components, e.g., via the launch mechanism, according to the startup sequence represented by the individual.

Implementations determine a launch metric for the individual based on the launch. A launch metric includes data from which the startup time for the individual can be determined. The startup time for an individual is the time that elapses between the launch of the first component (launch time of the first component) in the sequence and the time the last component gets ready (latest ready time of the components in the startup sequence). The last component to get ready may not be the same as the last component in the startup sequence. In some implementations, the launch metric may also include a ready time for each component in the startup sequence. The ready time may be used to validate offspring, to mutate individuals, and/or to guide offspring selection. In some implementations, the genetic ordering tool may continue the process of generating a new population from the fittest of the current population until the fitness of a best fit individual in the current population is within a predetermined threshold of the best fit individual in the new population. In some implementations, the genetic algorithm based ordering tool may continue the process of generating a new population from the fittest individuals of the current population until the best fit individual in the new population has a startup time within a predetermined threshold.

As used herein, a search based ordering tool is a heuristic search that explores a tree by evaluating promising branches and pruning less promising branches. Some implementations may build a tree from an initial startup sequence and the launch metrics associated with the initial startup sequence. Implementations may use a heuristic to change the startup sequence and steer the ordering process. Some implementations may use domain specific knowledge to generate and search the tree. As used herein, a heuristic is a function that assigns a value to each option when a decision needs to be made between two or more options, and selects the most likely option based on the value. The heuristic learns how to better assign the values based on results of previous decisions.

As used herein, a neural network ordering tool is a machine learning ordering tool that learns tasks by analyzing example data utilizing a plurality of layers that analyze features of the example data at different levels of abstraction. In particular, a neural network can include a model of interconnected digital neurons that communicate and learn to approximate complex functions and generate outputs based on a plurality of inputs provided to the model. In the context of a startup sequence, a neural network ordering tool may use features of the components of a modular system and launch metrics to learn an efficient startup sequence for the components.

Details of the systems and techniques are discussed below with respect to the illustrated figures. FIG. 1 is a block diagram of a computing system 100 that identifies an efficient startup sequence for components of a modular system, according to an implementation. The system 100 includes at least one memory 104, at least one processor 106, an operating system (not shown), and one or more modules, such as modular system 110, startup order discovery application 120, and library 140. The system 100 may communicate with one or more other computing devices (not shown) over a network (not shown), e.g., the Internet, an intranet, a cellular network, etc. The system 100 may be implemented as a server, a desktop computer, a laptop computer, a mobile device such as a tablet device or mobile phone device, as well as other types of computing devices. The computing system 100 can be a single computing device or multiple computing devices in communication with one another, such as multiple servers cooperating with one another to perform one or more functions over a network. The computing system 100 may thus be a distributed system. The startup order discovery application 120 may operate on a single computing device or on a distributed computing system. The modular system 110 may be local to the computing system 100 or may be remote from, but accessible to, the computing system 100.

The at least one processor 106 may represent a single processor or two or more processors on the computing system 100 executing in parallel. The at least one processor 106 may execute instructions stored using the at least one memory 104. In some implementations, the at least one processor 106 may be a specialized processor, e.g. a graphics processing unit (GPU). The at least one memory 104 represents a non-transitory computer-readable storage medium. The at least one memory 104 may represent one or more different types of memory utilized by the computing system 100. The at least one memory 104 may be cache. The at least one memory 104 may be disc memory. The at least one memory 104 may be Random Access Memory. The at least one memory 104 may store instructions that allow the at least one processor 106 to implement disclosed embodiments. The at least one memory 104 may store data, such as one or more startup sequences 133, parameters 113, etc. The at least one memory 104 may also be used to store processes and modules, such modular system 110, startup order discovery application 120, library 140, etc., and their components.

The modular system 110 can be any system that executes one or more modular applications. A modular system includes a plurality of components 115. For example, the modular system 110 may include component 115(1), 115(2), 115(3), . . . , and 115(n) where n is any non-zero positive integer. The modular system 110 may include a few, e.g., 10, 15, 20, or many, e.g., 100, 200, 500, etc., components 115. Each component 115 may be a small set of instructions executable by a processor. A component 115 may have zero, one, or more dependencies. A component with zero dependencies can be launched in any position of a startup sequence and does not depend on any other component being launched or loaded. A component with one dependency is optimally launched after the dependency is satisfied. A component with multiple dependencies is optimally launched after all dependencies are satisfied. The startup order discovery application 120 identifies an efficient startup sequence for the components 115(1) to 115(n). As used herein, a startup sequence is an order in which components are launched. The efficient startup sequence need not represent the best or most ideal startup sequence. Rather, as used herein, the efficient startup sequence represents a startup sequence within an acceptable threshold, e.g., compared to a previously identified efficient startup sequence.

The startup order discovery application 120 may be configured to receive parameters 113 from the modular system 110. In some implementations, the parameters 113 include the components 115 to be included in the startup sequence. The parameters 113 may include identifiers for these components 115. The identifiers can be a component name, a component location, a numeric identifier, or some other identifier. In some implementations, the parameters 113 may include a mechanism for launching the components 115. For example, the parameters 113 may include an application program interface (API) call, a function name, a start command, a batch file, or other mechanism for launching the modular system 110 (the modular application). In some implementations, the modular system 110 and components 115 are remote from the computing system 110, so the launching mechanism may include an indication of where (e.g., on which computer system) the modular system 110 executes. In some implementations, the parameters may include an initial startup sequence. In some implementations, the parameters may include optimization rules, such as a known dependency. In some implementations, the optimization rules may guide or influence how potential startup sequences are generated.

The startup order discovery application 120 may invoke one or more machine learning ordering tools 130 to identify an efficient startup sequence for the components 115. In some implementations, the startup order discovery application 120 may use one machine learning algorithm based ordering tool 130. In some implementations, the startup order discovery application 120 may use more than one machine learning algorithm based ordering tool 130. In implementations that use more than one machine learning algorithm based ordering tool, the machine learning ordering tools 130 may be stored in a library 140. In some implementations, the startup order discovery application 120 may base selection of a machine learning algorithm based ordering tool 130 on one or more of the domain of the modular system 110, the number of components 115 being evaluated, the programming language used and/or frameworks used for the implementation, etc. In some implementations, the startup order discovery application 120 may request a potential efficient startup sequence from two or more of the machine learning algorithm based ordering tools 130. In such implementations, the startup order discovery application 120 may select the efficient startup sequence as the best (e.g., most fit, fastest startup time) of the potential startup sequences. The startup order discovery application 120 may provide the efficient startup sequence 118 as a response.

The machine learning ordering tools 130 may represent various machine learning techniques configured to optimize the startup time of the components 115 identified in the parameters 113. For example, machine learning ordering tool 130(1) may be using a genetic technique, machine learning ordering tool 130(2) may be using a heuristic search based technique (e.g., alpha-beta search, beam search, proof number search, etc.) and machine learning ordering tool 130(3) may be using a neural network trained to predict a startup sequence for components based on features of the components. Implementations may use other types of machine learning techniques to identify the efficient startup sequence. Each of the machine learning ordering tools 130 may rely on a launch metric to guide the selection of the startup sequences. The launch metric includes information from which to determine the startup time of a particular startup sequence. The machine learning ordering tools 130 may all be configured to favor shorter startup times. In some implementations, the launch metric may include additional data for guiding the selection and generation of potential startup sequences. For example, in some implementations, the launch metric for a startup sequence may include the ready time (e.g., timestamp) of each of the components. The ready time is an indication of when the component completed the launch process, e.g., the component is in a running state and ready to handle requests. The machine learning ordering tools 130 may use this data (e.g., the ready time) to prune sequences where a first component has a ready time after the ready time for a second component that occurs later in the sequence. Such a condition may be an indication that the first component is dependent on the second component.

In some implementations, the ML ordering tool 130(1) is a genetic machine learning technique. In a genetic machine learning technique, the ML ordering tool 130(1) generates a population of individuals. Each individual is a different startup sequence. A population is thus a collection of different startup sequences. The number of startup sequences in the population may be based on the number n of components 115 in each startup sequence. For example, the number of startup sequences in the population can be a percentage of the number of components, e.g., 10%, 20%, 30%, etc. The percentage may be based on the number of components. The percentage may have an inverse relationship with the number of components, so that the percentage decreases as the number of components increases. For example, in a system with 10 components the number of startup sequences in the population may be nine (90% of the number of components) or ten (100% of the number of components), but a system with 500 components may use 50 startup sequences (10% of the number of components) for the population. For the ease of discussion, machine learning ordering tool 130(1) will be described as having n startup sequences in the population, where n is also the number of components, but implementations are not so limited.

For an initial population, the machine learning ordering tool 130(1) may generate n startup sequences for the current population. In some implementations, each startup sequence is a randomly selected startup sequence. In some implementations, at least some of the startup sequences may be generated according to one or more optimization rules, such as a known dependency. If an initial startup sequence is provided, the initial startup sequence may be included in the initial population. The system may obtain a launch metric for each startup sequence, e.g., by launching the modular application via the launch mechanism (e.g., from parameters 113) using the startup sequence. For example, in some implementations, the system may record information from which the system can determine a startup time for the startup sequence. In some implementations, the information can include a launch timestamp and a ready timestamp. In some implementations, the information may represent the difference between a launch timestamp and a ready timestamp. The machine learning ordering tool 130(1) may then generate a new population of startup sequences (individuals). The new population, also referred to as the next generation, has the same number of startup sequences as the current generation. The new population may include some of the most fit individuals from the current generation. The most fit individuals are selected based on their respective launch metrics. In some implementations, this may be the startup time, e.g., selecting individuals with lowest startup time. In some implementations, this may be an inverse of the startup time, e.g., selecting individuals with highest inverse. In some implementations, the startup sequences selected as most fit may be selected probabilistically. For example, the probability may be a ratio of the individual's fitness to the fitness of other members of the current population. Such a probability may be expressed as $$Pr(s_i) = \frac{\text{Fitness}(s_i)}{\sum_{j=1}^{n} \text{Fitness}(s_j)}$$

where $s_i$ is the current startup sequence and $Pr(s_i)$ is the probability for that startup sequence and Fitness( ) is a measure of the startup time (speed) or an inverse of the startup time. Accordingly, as used herein, most fit is any measure of the startup sequence's startup speed against the startup speed of other startup sequences, where a shorter startup is favored.

In some implementations, the machine learning ordering tool 130(1) may select a percentage of n of the most fit individuals for the new population. For example, the machine learning ordering tool 130(1) may use 10% of n, i.e., top 10% of the startup sequences from the current population and add these startup sequences to the new population (next generation). To complete the remainder of the next generation, the machine learning ordering tool 130(1) may perform a crossover operation on pairs of startup sequences from the current population. The pairs of startup sequences may be selected probabilistically, e.g., so that startup sequences considered more fit from the current generation are more likely to be selected as a participant in a crossover operation. In some implementations, the selection may be based on known techniques such as tournament selection, ranking, fitness probability, etc.

Once pairs of parents are selected, the machine learning ordering tool 130(1) may perform a crossover operation on the parent pairs. Any one or more known crossover operations may be used. For example, one known crossover operation is a single point crossover. In a single point crossover operation, one crossover point is selected and components occurring before that point in the startup sequence for one startup sequence in the parent pair are swapped for the components occurring before that point in the startup sequence for the other startup sequence in the parent pair, generating two offspring. For example, if startup sequence 1 has the startup sequence [a,d,f,b,c,e] and startup sequence 2 has the startup sequence [e,b,d,f,a,c] and the crossover operation has a crossover point occurring at position two, the two offspring are [a,b,d,f,a,c] and [e,d,f,b,c,e]. A crossover operation may have double, triple, quadruple, etc. crossover points. For example, in a double point crossover with the first crossover being at index two and the second crossover point being at index six, the two offspring would be [a,b,d,f,a,e] and [e,d,f,b,c,c]. The more components that appear in the start sequence, the more crossover points the crossover operation may have. In some implementations, the crossover points may be selected at random in each crossover. Implementations may use other crossover operations, such as uniform crossover, where each sequence position is chosen from either of the parents with equal probability, or one of the crossover operations that operate on ordered lists. Crossover operations that operate on ordered lists include partially matched crossover (PMX), cycle crossover (CX), order crossover operator (OX1), order-based crossover operator (OX2), etc.

Regardless of the crossover operation used, the machine learning ordering tool 130(1) may validate offspring before adding the offspring to the new generation. For example, the offspring [a,b,d,f,a,e] includes two references to component a but no reference to component c. Because of this, the offspring is not a valid startup sequence. To ensure the offspring is valid, the system may remove a duplicate component and substitute it with a missing component. In some implementations, further validation may include ensuring that the offspring's startup sequence accounts for ready times in the launch metric. For example, if module a is known to be dependent on module d (based on an earlier ready time for d when a occurs before d in the startup sequence), the system may favor startup sequences where a occurs later than d in the startup sequence. Thus, for example, the component c may replace the first a in the offspring [a,b,d,f,a,e] rather than the second because a is known to be ready after d for cases where it was launched before d.

The machine learning ordering tool 130(1) may use crossover operations to fill out the remaining new population. For example, if the machine learning ordering tool 130(1) pulls the top 15% of the current generation into the new generation, the machine learning ordering tool 130(1) will use crossover to populate the remaining 85%. As indicated above, parents are selected probabilistically for crossover and different crossover operations can be used on different parents.

In some implementations, the machine learning ordering tool 130(1) may perform mutation on the new generation. A mutation selects two components in a startup sequence and swaps them. In some implementations, mutations may be performed on some percentage (e.g., 5%, 10%, 20%, etc.) of the new population. This step may be optional in some implementations.

Once a next generation is populated, the machine learning ordering tool 130(1) may obtain launch metrics for the startup sequences in the next generation, e.g., by launching the modular system via the launch mechanism using the startup sequence. In some implementations, the machine learning ordering tool 130(1) may pass the new population back to the startup order discovery application 120, and the startup order discovery application 120 may obtain the launch metrics for each startup sequence. The system 100 (e.g., startup order discovery application 120 or machine learning ordering tool 130(1)) may determine whether an efficient startup sequence has been identified or whether further iterations may be needed. The system 100 may use an optimization criterion to determine if additional iterations are required. The optimization criterion may include a startup time under a predetermined threshold, a startup time within some threshold of a best (shortest) startup time from a previous round, etc. If a startup sequence of either the new generation or current generation meets the optimization criterion/criteria, the system 100 may consider the operation complete, i.e., an efficient startup sequence has been identified. This startup sequence may be provided back to the modular system 110 as efficient startup sequence 118.

In some implementations, the machine learning ordering tool 130(2) may be a tree-based heuristic search technique. A heuristic is a function that has domain-specific knowledge. When a decision needs to be made between two or more options, the heuristic assigns a value representing likeliness for each of the available options. For example, with a choice between 'left' and 'right', the heuristic might assign left as 0.38 and right as 0.89. The heuristic chooses 'right' in this case because it is more likely. The heuristic can learn (update itself) how to better assign the values based on results of previous decisions. Accordingly, the next time the heuristic makes a choice, the heuristic may assign "right" a lower value. In some implementations, the machine learning ordering tool 130(3) may be a neural network ordering tool or a similar machine learning network. A neural network ordering tool learns to order the components by analyzing features of example components and startup sequences. In particular, a neural network ordering tool may learn from known efficient startup sequences how to predict an efficient startup sequence. In some implementations, the startup order discovery application 120 may be configured to receive an efficient startup sequence from two or more of the machine learning ordering tools 130 and to select a most fit sequence to return as startup sequence 118.

In some implementations, the system 100 may be in communication with one or more other computing devices over a network. For example, the modular system 110 may execute on a computer system remote from, but accessible by computing system 100. Similarly, one or more of the machine learning ordering tools 130 may be removed from but accessible to the startup order discovery application 120. Thus, the configuration of system 100 is one example configuration and implementations include other configurations that operate using communications over one or more networks.

Figure 2:
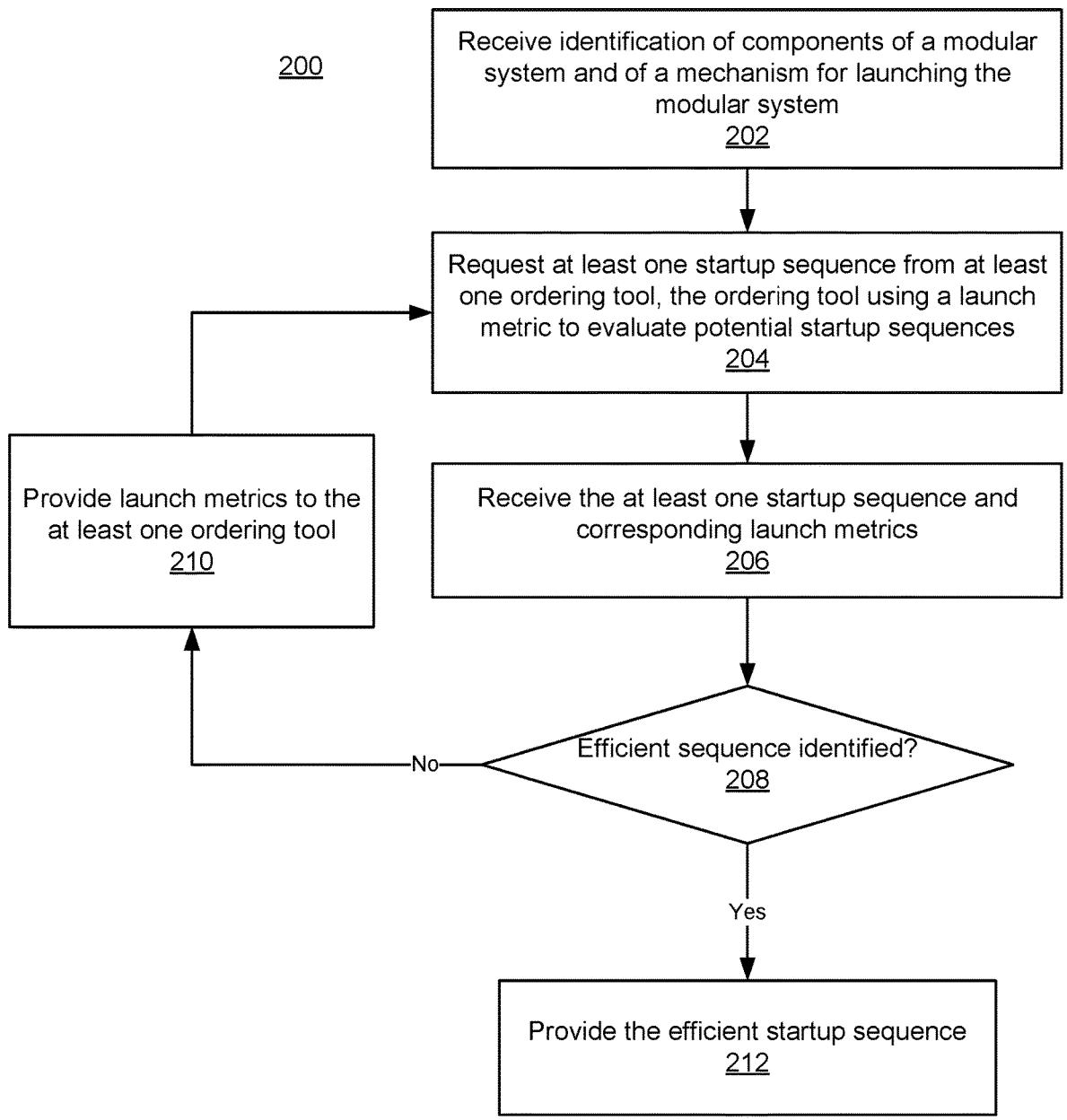
FIG. 2 is an example flowchart illustrating a process that identifies an efficient startup sequence for components of a modular system, according to an implementation.

FIG. 2 is an example flowchart illustrating a process 200 that identifies an efficient startup sequence for components of a modular system, according to an implementation. The process 200 may be performed by a system, such as system 100 of FIG. 1. Process 200 may obtain efficient startup sequences from one or more machine learning processes. In some implementations, the system may require multiple iterations to determine an efficient startup sequence. Process 200 returns an efficient startup sequence to the requesting process. The efficient startup sequence need not be the absolute best startup sequence. The efficient startup sequence need only satisfy an optimization criterion/criterion, e.g., launching the modular system in the fastest time discovered, launching the modular system in a time that falls within a threshold of a previously most fit startup sequence, etc. Thus, for example, in a modular system with 500 components, implementations may not test all 500! (1.22e+1134) different possible sequences of components but may provide as an efficient sequence a startup sequence that launches the modular system within a predetermined time, within a threshold time of a prior fastest launching sequence, or not found to improve a previously measured sequence times significantly (e.g., a 5 to 10% improvement over the previous sequence time).

Process 200 begins by receiving a plurality of components of a modular system (202). The modular system is also referred to as a modular application. As used herein, "the application" refers to a modular system, or in other words a modular application. The components may have an identifier. For example, each component may have a function name, a file name, a numeric or symbolic identifier, etc. In some implementations, the identifier may include an address or location where the component can be accessed. The system may also receive a mechanism for launching the application. The mechanism for launching the application may be an API, a function name, a configuration file, a start script or some other similar mechanism for starting the application. The system may request at least one startup sequence from at least one machine learning ordering tool (204). The system may include one machine learning ordering tool. The system may include two or more machine learning ordering tools. In some implementations, the system may select one of the tools based on domain of the application, the number of components being evaluated, programming language, hardware platform and/or frameworks used by the implementation. In some implementations, the system may request that each machine learning ordering tool provide a suggested efficient sequence. In some implementations, the system may request that a subset of the machine learning ordering tools provide a potential efficient startup sequence, e.g., based on domain of the application, number of components, etc. Each of the machine learning ordering tools may use a different machine learning technique to provide a potential efficient startup sequence.

The system may receive at least one potential startup sequence from each of the machine learning ordering tools that processed a request (206). Some machine learning ordering tools may provide one potential efficient startup sequence. Some machine learning ordering tools may provide multiple potential efficient startup sequences. In some implementations, the machine learning ordering tool may provide a respective launch metric for each potential startup sequence. The launch metric may include information from which to determine a startup time, which represents the time it takes for the application to fully launch once the first component in the startup sequence is launched. The launch metric may also include other information, for example a time at which each component became ready to serve requests. In some implementations, the machine learning ordering tool may provide the potential startup sequence(s) and the system may generate launch metrics for each potential startup sequence. For example, the system may launch the application using the startup sequence via the mechanism for launching the application. The system may record the launch metrics for this launch.

The system may use the launch metrics to determine whether an efficient sequence has been identified (208). For example, the system may use the startup time to determine whether one of the potential startup sequences has a time that meets a predetermined threshold. If at least one has a speed that meets the threshold (208, Yes), then the startup sequence with the fastest startup time may be provided as the efficient startup sequence (212). As another example, the system may determine whether the fastest startup time of the potential startup sequences falls within a threshold of the previously fastest startup sequence, e.g., from a previous round. If the startup time does fall within this threshold, the system may determine that an efficient sequence has been identified (208, Yes). This threshold represents a balance between consuming further resources to find a best startup sequence where the improvements in speed are small, and possibly not worth the extra resources expended. In other words, expending a lot of resources to gain a second may not be worth the resources expended, as the one second difference is not appreciable. The balance may be dependent on the implementation, as in some cases that rely on real-time transactions (e.g., stock trading), one second may be crucial.

If a threshold condition is met, the system may return the fastest startup sequence (based on the launch metrics) as the efficient startup sequence (212). If an efficient sequence is not yet identified (208, No), the system may request that the one or more machine learning ordering tools perform another round of optimization (210). In some implementations, this may include generating launch metrics for one or more of the potential startup sequences. In some implementations, the best startup sequence from the current round may be provided as a seed to the next round. In some implementations, all potential startup sequences may be provided to the one or more machine learning ordering tools for the next round, where steps 204 to 208 are repeated. Other configurations of process 200 are possible. For example, in some implementations, one or more of the machine learning ordering tools may perform several rounds (e.g., steps 206, 208, and 210) before providing a potential startup sequence, making such steps unnecessary outside of the processing performed by the particular tool.

Figure 3:
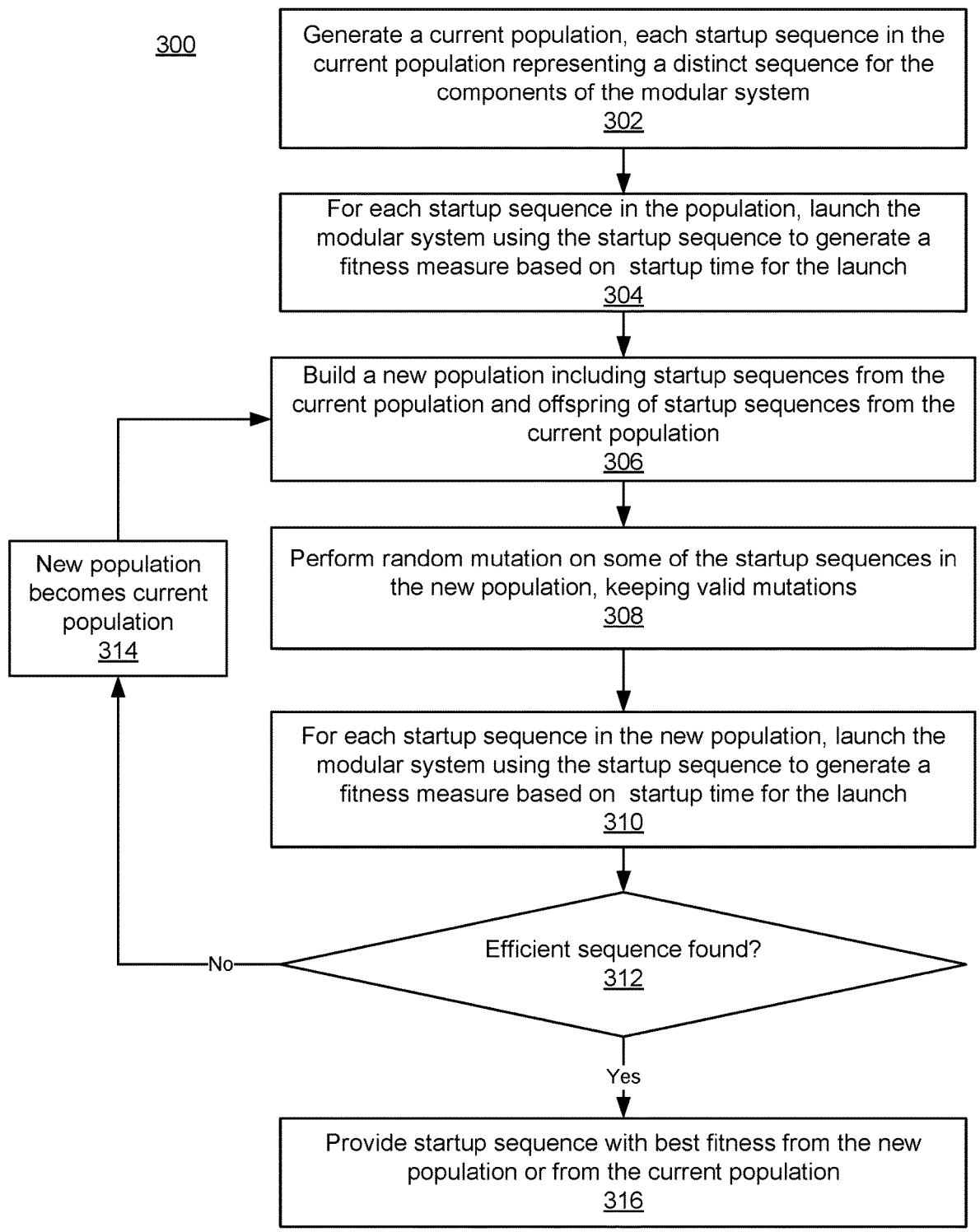
FIG. 3 is an example flowchart illustrating a process for using a genetic ordering tool to identify an efficient startup sequence, according to an implementation.

FIG. 3 is an example flowchart illustrating a process 300 for using a genetic algorithm based ordering tool to identify an efficient startup sequence, according to an implementation. Process 300 represents one example of a machine learning ordering tool that can be used as part of a system, such as system 100 of FIG. 1. Process 300 is an example of a machine learning ordering tool that performs its own iterations, e.g., steps 206 to 210 of FIG. 2. Process 300 is one example of a genetic machine learning technique, but implementations can include variations on the exact technique illustrated. In some implementations (not shown), the machine learning ordering tool may employ a heuristic to identify components that are not significant to the sequence ordering and prune them from the sequence. This reduces the number of possible sequences that need to be analyzed. Any pruned components may be added back to the efficient startup sequence, e.g., at the beginning or at the end, before launching the modular system to generate launch metrics. Thus, in the discussion of process 300, the number of components in a startup sequence may be less than the actual number of components. In other words, when generating new startup sequences as outlined below, the startup sequence may include fewer components than the total number of components, but any pruned components are added back to the sequence before it is returned as an efficient startup sequence or before it is launched.

Process 300 begins by generating a current population from the plurality of components (302). A current population includes a plurality of individuals. Each individual represents a different potential startup sequence for the plurality of components. The population can have any number of startup sequences. In some implementations, the number of startup sequences in the population can be based on the number of components in the plurality of components. For example, in some implementations, the system may select a percentage of the number of components as the number of startup sequences, e.g., 10%, 50%, 80%, etc. Thus, for example the system may generate 15 individuals (15 different startup sequences) if there are 150 components and the system uses 10% of the number of components or if there are 30 components and the system uses 50% of the number of components. In some implementations, the system may generate random startup sequences for this initial current population. In some implementations, the system may start with a last known efficient sequence and generate at least some startup sequences based on the last known efficient sequence. In some implementations, the system may use a predefined order as an initial sequence and generate at least some startup sequences based on the predefined order. In some implementations, the startup sequences in the current population may also meet some optimization rules, e.g., where some dependencies are known ahead of time the system may ensure that the startup sequences in the current population do not violate the known dependency.

The system then generates a respective launch metric for each of the startup sequences (304). The system generates a launch metric by launching the application using the startup sequence via the mechanism for launching the application. The launch metric includes information from which to determine a startup time for the application using the startup sequence. The startup time includes the time that elapses between the launch request and the time when the application is ready to serve, i.e., has finished loading and initializing. In some implementations, the launch metric may also include information from which the system may determine the ready time of an individual component, i.e., when the component is ready to serve and/or how long it took the component to start.

The system then builds a new population (306). The new population has the same size as the current population. The new population includes some of the startup sequences from the current population. In some implementations, startup sequences from the current population are selected based on the respective launch metrics. For example, startup sequences considered most fit, e.g., with the fastest startup times, may be selected for the new population. In some implementations, a percentage of the new population may be selected from the startup sequences considered most fit in the current population. The percentage can be fixed, e.g., 20%, 15%, 10%, 5%, etc. The remainder of the startup sequences in the new population are generated using crossover operations performed on the startup sequences of the current population. A crossover operation produces two offspring, or two new startup sequences, from two parent startup sequences by copying selected components in their current position from each parent. Implementations can use any known or later developed crossover operation. Example crossover operations include but are not limited uniform crossover, partially matched crossover, cycle crossover, order-based crossover, and others. An example crossover operation is explained above with regard to machine learning ordering tool 130(1) of FIG. 1. In some implementations, new startup sequences may be verified, e.g., to ensure that each startup sequence includes one reference to each component. Generating a new population is explained in more detail with regard to FIG. 4. The startup sequences generated by crossover may represent the remainder of the new population not copied from the current population. The new population may have the same number of startup sequences as the current population.

In some implementations, the system may optionally perform mutations on some of the startup sequences in the new population (308). Mutation may be optional and not included in every implementation. A mutation swaps the start order of at least two of the components in a startup sequence. The system may select some predetermined number of startup sequences for mutation. The startup sequences may be selected at random. The mutations (e.g., which positions are swapped) can be random. The mutations can be based on a heuristic. In some implementations, the mutations may be validated against one or more optimization rules. In some implementations, the optimization rules can be implemented as a dependency graph. The dependency graph may be partial, e.g., representing only some of the components. In some implementations, the system may be provided dependencies, e.g., as part of the parameters. In some implementations, the system may use launch metrics to discover a dependency. For example, the system may use the time at which each component is ready (is fully loaded and initialized) to determine that a first component needs a second component to be started before it can start. Such partial dependencies can be used as optimization rules to guide the mutations, e.g., disallowing a mutation that results in the first component being ahead of the second component in the startup sequence.

For each startup sequence in the new population, the system may generate respective launch metrics (310), essentially repeating step 304 but for startup sequences in the new population. The system may determine whether an efficient startup sequence has been found (312). For example, in some implementations, the system may determine whether any startup sequence in the new population has a launch time that meets a predetermined threshold (e.g., under 5 seconds, under 10 seconds, etc.), as some implementations may consider any startup time under a predetermined time as acceptable. As another example, in some implementations, the fitness of a best fit startup sequence in the current population may be compared with the fitness of a best fit startup sequence in the new population. If the fitness of the two startup sequences are within some predetermined threshold (e.g., a few seconds, a few milli-seconds, etc.), the system may determine that further generations would be unlikely to improve the startup time sufficiently to justify expending additional resources to investigate additional startup sequences. In this scenario the best fit startup sequence may be considered the efficient startup sequence. If an efficient sequence is found (312, Yes), that startup sequence may be returned (316), e.g., to the requesting process. The best fit startup sequence can be from either the current population or the new population. If the efficient startup sequence is not yet identified (312, No), the system performs another round, making the new population the current population (314) and generating another new population (306). This process of generating a new population and evaluating the fitness of the population continues until an efficient startup sequence is identified (312, Yes) and provided, as explained above. Process 300 then ends.

Figure 4:
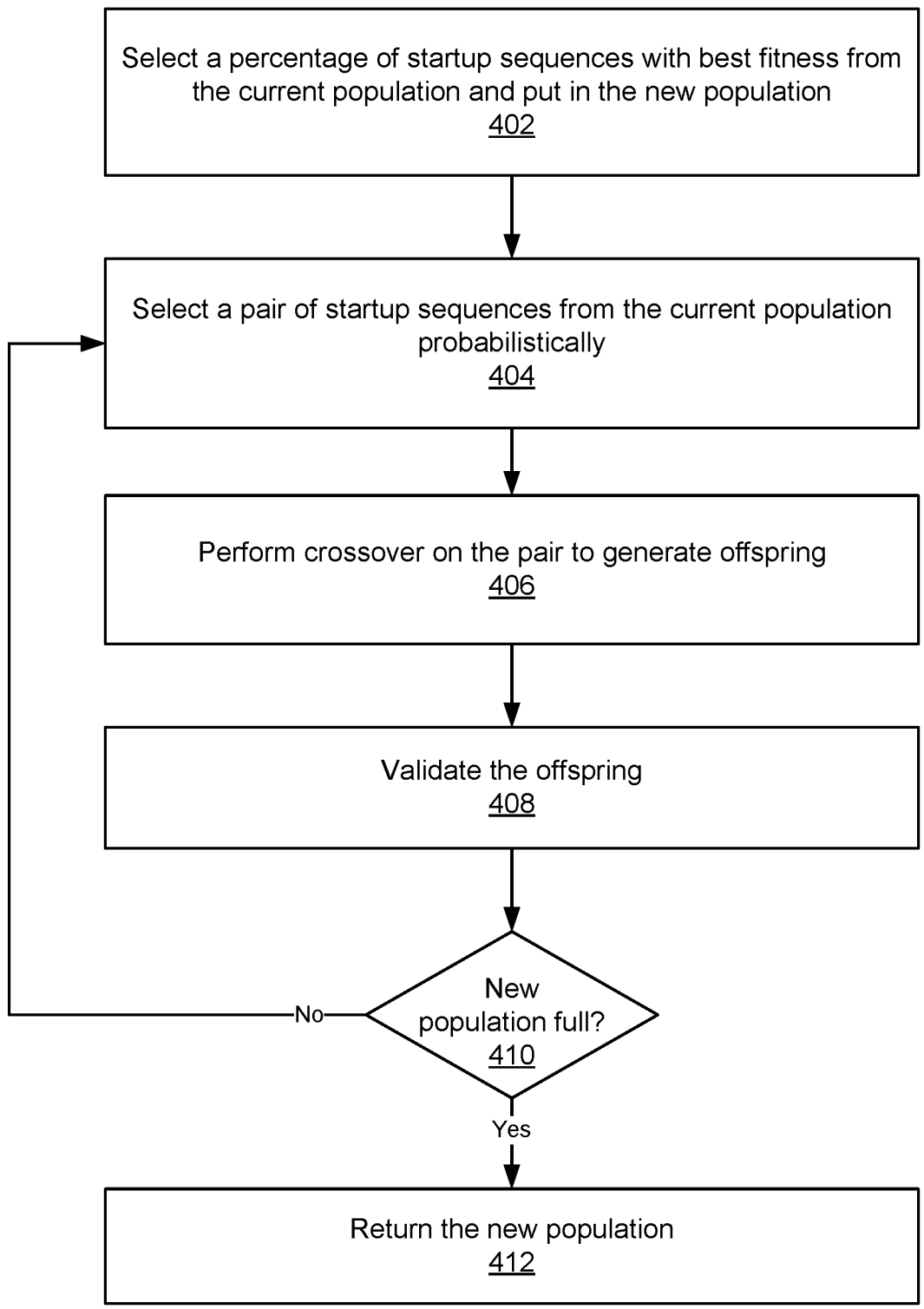
FIG. 4 is an example flowchart illustrating a process for generating individuals in a new population for the genetic ordering tool, according to an implementation.

FIG. 4 is an example flowchart illustrating a process 400 for generating startup sequences for a new population for the genetic ordering tool, according to an implementation. Process 400 is one example of step 306 of FIG. 3. Process 400 begins by selecting a percentage of startup sequences with best fitness from the current population and adding those startup sequences to the new population (402). Fitness can be measured in a number of ways and generally represents a shorter startup time. In some implementations, fitness may be measured as actual startup time. In such implementations, a best fit startup sequence has a lowest fitness score. In some implementations, fitness may be measured as an inverse of the startup time (e.g., 1/t, where t is the startup time of a particular startup sequence). In such implementations a best fit startup sequence will have the highest fitness score. The percentage of startup sequences added directly from the current population to the new population may be implementation dependent. Example percentages are 5%, 10%, 15%, etc.

The system may then fill out the new population using one or more crossover operations. A crossover operation produces two new startup sequences from two startup sequences. One or both of the new startup sequences may be added to the new population. The parents may be selected probabilistically using known or later developed techniques, such as proportionate selection, tournament selection, rank selection etc. For example, in a proportionate selection, a startup sequence is selected with a probability given by the ratio of its fitness to the fitness of the other members of the current population. This probability may be expressed as $$Pr(s_i) = \frac{\text{Fitness}(s_i)}{\sum_{j=1}^{n} \text{Fitness}(s_j)}$$

where $s_i$ is the current startup sequence and $Pr(s_i)$ is the probability for that startup sequence and Fitness( ) is a measure of the startup time or an inverse of the startup time. In other words, startup sequences with better fitness may be more likely to be selected as a parent for crossover. All startup sequences from the current population may be considered for a parent pair. Other probabilistic selection techniques (such as tournament selection or rank selection) may also be used.

Once a parent pair is selected, the system performs a crossover operation on the pair to generate offspring (406). Any one or more known crossover operations may be used on a parent pair. An example crossover operation is a single point crossover. In a single point crossover operation, one crossover point is selected and components occurring before that point in the startup sequence in the parent pair are swapped for the components occurring before that point in the other startup sequence in the pair, generating two offspring, or in other words two startup sequences potentially for the new generation. Crossover operations may have two, three, four, or more crossover points. In some implementations, the number of crossover points may be dependent on or some function of the number of components in each startup sequence. In some implementations, the crossover points may be selected at random in each crossover. In some implementations, the location of the crossover points may be fixed. Implementations may use other crossover operations, such as uniform crossover, where each sequence position is chosen from either of the parents with equal probability, or one of the crossover operations that operate on ordered lists, such as partially matched crossover (PMX), cycle crossover (CX), order crossover operator (OX1), order-based crossover operator (OX2), etc.

Regardless of the crossover operation used, the system may validate the offspring before adding one or both to the new population (408). Validating offspring may be optional. Validating the offspring may include ensuring that the offspring (the startup sequence) represented has one of each of the components. Crossover can result in the offspring have some duplicate components and some missing components. Validation can replace a duplicate (either the first occurrence or the second occurrence) with a missing component. In some implementations, validation may include discarding startup sequences containing duplicates. In some implementations, validation may include ensuring that the startup sequence does not already exist in the new population. In some implementations, validation can include ensuring that the startup sequence complies with optimization rules. For example, as a parameter or through analysis of launch metrics, the system may determine that a first component is dependent on a second component. This small bit of information can be used to ensure that the first component always appears later in a startup sequence than the second component. If a startup sequence does not meet such an optimization rule, the system may discard the startup sequence or mutate the startup sequence so that the second component appears before the first component in the start sequence.

The system may continue selecting parent startup sequences, performing crossover, and validation until the new population is full (410, Yes). The new population is full when it has as many startup sequences as the current population. The new population is then returned for further evaluation (412) and process 400 ends.

Figure 5:
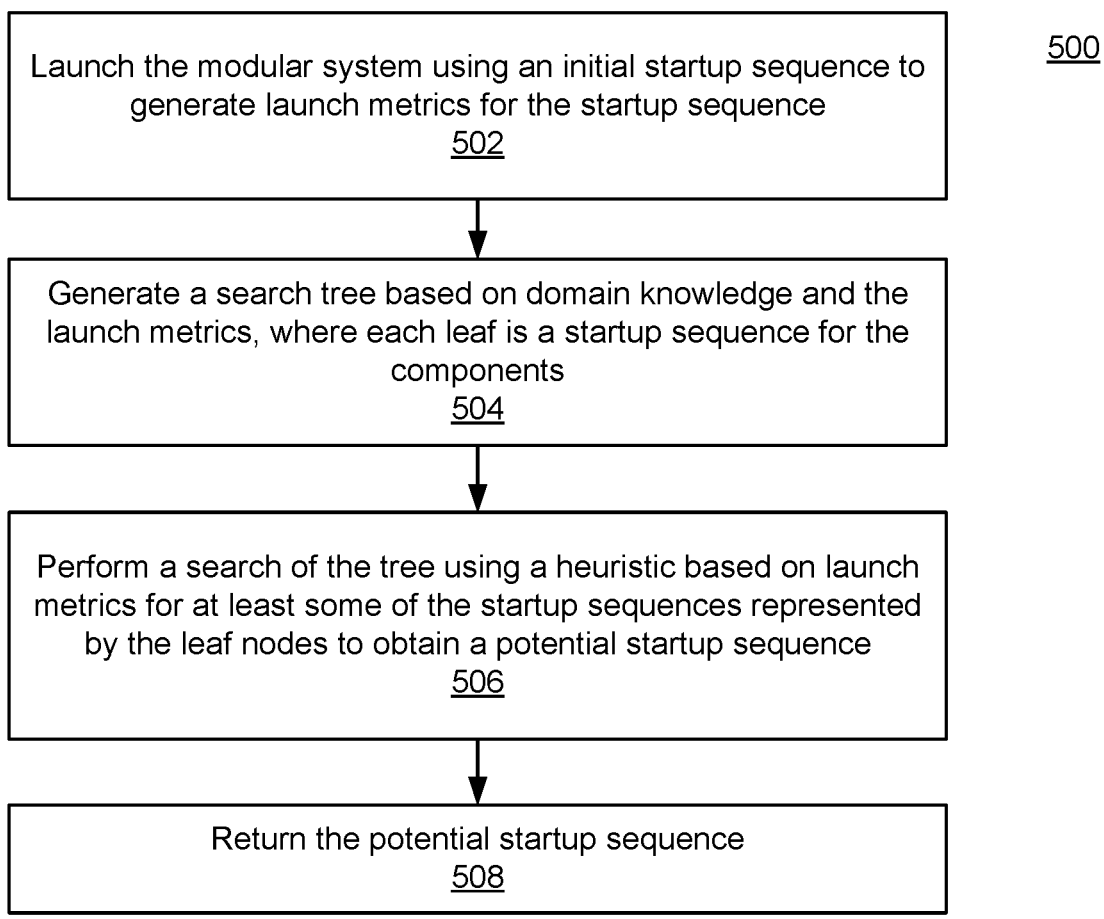
FIG. 5 is an example flowchart illustrating a process for using a beam search ordering tool to identify an efficient startup sequence, according to an implementation.

FIG. 5 is an example flowchart illustrating a process 500 for using a search based ordering tool to identify an efficient startup sequence, according to an implementation. Process 500 is one example of a machine learning ordering tool used in a system, such as system 100 of FIG. 1. Process 500 may be executed in addition to or instead of process 300 for a particular application and set of components.

Process 500 may begin with receipt of an initial startup sequence and generating launch metrics for the initial startup sequence (502). Using the launch metrics, generate a search tree based on domain knowledge and the launch metrics (504). Each leaf in the search tree may represent a different startup sequence for the components. In one example, to build the tree the system may start with an empty sequence. The system may query a heuristic function, which will provide a component to add next to the sequence. The system may repeat this until arriving at a leaf, at which point a complete sequence has been generated. Each point at which the search tree branches is a decision point where the heuristic decides what is added next. At the start of the tree there are n choices, but closer to the leaves of the tree the number of choices becomes much smaller as most of the components have already been assigned a place in the sequence. In some implementations, the number of leaves generated may be limited to a predetermined number. In other words, the search tree does not include every possible startup sequence; rather the search tree may include x leaves, where x is the predetermined number. Like the size of the population in the genetic algorithm, the number of leaves may be based on the number of components, e.g., 10%, 20%, 50%, 80%, etc., of the number of components.

In some implementations, the search-based ordering tool may identify components that are not significant to the sequence ordering and prune them from the sequence. This reduces the number of possible sequences that need to be analyzed by the tree search. Any pruned components may be added back to the startup sequence, e.g., at the beginning or at the end, before generating launch metrics or returning an efficient startup sequence. Thus, the number of components in a startup sequence for a leaf may be less than the actual number of components. In other words, when generating the leaves as outlined above, the heuristic may be evaluating and selecting from fewer components than the total number of components; any such previously pruned components may be added back to the sequence, e.g., before it is returned as an efficient startup sequence, before it is stored as a leaf, or before it is launched to generate launch metrics.

The system then performs a search of the tree using a heuristic based on launch metrics for at least some of the startup sequences represented by the leaves to obtain a potential startup sequence (506). For example, after reaching a leaf node the system may launch the modular system using the startup sequence of the leaf. The launch metrics obtained for the launch may update the heuristic, so that the heuristic can evaluate the remaining branches in the tree. The heuristic thus enables the search to prune (not search) some branches. Thus, the system may not obtain a launch metric for every leaf. The system may continue to search the tree until a stop condition. The stop condition may occur because a maximum number of evaluations has been made or a best result (fastest startup time encountered) has been identified as a potential startup sequence. The system may return the potential startup sequence for evaluation (508). Process 500 is an example of a machine learning technique that may require multiple iterations, e.g., called multiple times as part of step 204 of FIG. 2 and receiving feedback on metrics for building a next tree as part of step 210 of FIG. 2. Thus, process 500 may be executed in a loop, e.g., multiple times, for a particular application and its components before an efficient startup sequence is identified.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Method steps may also be performed in a different order than illustrated in the figures.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

According to one general aspect a computer-implemented method includes receiving from a requesting process, information identifying a plurality of components of an application and information identifying a mechanism for launching the application, selecting at least one machine-learning ordering tool to provide a set of startup sequences, and obtaining a set of startup sequences from the at least one machine-learning ordering tool, each startup sequences having an associated launch metric. The method further includes evaluating the startup sequences based on the launch metrics to determine an optimal startup sequence and providing the optimal startup sequence. The application uses the optimal startup sequence as its default launch sequence.

According to one general aspect, a computer-implemented method includes receiving, from a requesting process, information identifying a plurality of components of a modular system and information identifying a mechanism for launching the modular system, generating a current population of startup sequences from the plurality of components, each startup sequence in the current population representing a different sequence of the plurality of components, and determining a respective launch metric for each startup sequence in the current population based on a lunch of the modular system via the mechanism. The method also includes building a new population, which includes a subset of the startup sequences in the current population and startup sequences generated from pairs of startup sequences in the current population, generating a respective launch metric for each startup sequence in the new population, and determining whether the new population includes a particular startup sequence with a launch metric that satisfies an optimization criterion. The method also includes, responsive to determining the new population includes a launch metric satisfying the optimization criterion, returning the particular startup sequence to the requesting process.

These and other aspects can include one or more of the following, alone or in combination. For example, the new population can include mutations of at least some of the subset of the startup sequences from the current population or mutations of at least some of the startup sequences generated from pairs of startup sequences in the current population. As another example, the startup sequences generated from pairs of startup sequences may be generated by crossover between the pairs. In some implementations, each startup sequence generated for a pair may be validated before being added to the new population. A startup sequence may be valid when it includes one reference to each component of the plurality of components. A startup sequence may be valid when it does not violate an optimization rule. A startup sequence may be valid when the startup sequence does not already exist in the new population. As another example, the plurality of components can include at least 100 components. As another example, the subset of the individuals may be a predetermined percentage of the new population and the offspring are a remaining percentage of the new population, the predetermined percentage being smaller than the remaining percentage.

As another example, the number of members in the current population may be based on the number of components in the plurality of components. As another example the launch metric can further include information from which to determine a ready time for each component, the ready time for a component representing a time at which the component is ready to process requests. In some implementations, the startup sequences generated from pairs in the current population are generated by crossover between the pairs and each startup sequence generated from a pair is validated using the ready time before being added to the new population, wherein validation includes ensuring that a component with an earlier ready time appears ahead of a component with a later ready time in the startup sequence. In some implementations, the method may include building a partial dependency graph based on the ready times and the startup sequences generated from pairs in the current population are validated using the partial dependency graph. As another example, determining whether the new population includes the particular startup sequence can include determining whether a startup time for a most fit startup sequence in the current population is within a threshold of a startup time for a most fit startup sequence in the new population and/or determining whether a startup time for a most fit startup sequence in the new population satisfies a predetermined threshold.

According to one aspect, a computer program product for generating an efficient startup sequence for a plurality of components of modular system comprises instructions that, when executed by at least one computing device, are configured to cause the at least one computing device to perform operations. The operations can include receiving, from a requesting process, an indication of the plurality of components of the modular system and an indication of a mechanism for launching the modular system, invoking a machine-learning ordering tool to generate at least one startup sequence, the at least one startup sequence being returned with corresponding launch metrics, and determining, based on launch metrics for the at least one startup sequence, whether an efficient sequence with a respective launch metric that satisfies an optimization criterion has been identified. Responsive to the efficient sequence being identified, the operations can include returning the efficient startup sequence to the requesting process, wherein the modular system is launched using the optimal startup sequence. Responsive to failing to identify the optimal sequence, the operations can include repeating the invoking and determining.

These and other aspects can include one or more of the following, alone or in combination. For example, the launch metric can include a startup time for the modular system and, for each component, a ready time indicating when the component completed loading. As another example, the operations may also include selecting the machine-learning ordering tool from a library of machine-learning ordering tools. In some implementations, the library includes a genetic algorithm based ordering tool, a tree search based ordering tool, or a neural network based ordering tool. In some implementations, the selection is based on a domain of the modular system. As another example, the launch metric can include information from which a startup time for the modular system can be determined.

According to one aspect, a method includes receiving a plurality of components of a modular system, an initial startup sequence, and a mechanism for launching the modular system, launching the modular system using the initial startup sequence to generate launch metrics, and generating a search tree based on domain knowledge, the initial startup sequence, and the launch metrics. Each leaf of the search tree represents an individual startup sequence. The method may also include performing a heuristic search of the search tree to obtain a potential startup sequence and determining whether the launch metric for the initial sequence is within a threshold of the launch metric for the potential startup sequence. Responsive to the launch metric being within the threshold, the method may include returning the potential startup sequence. Responsive to the launch metric being outside the threshold, the method may include repeating the generating, performing, and determining using the potential startup sequence as the initial startup sequence.

According to one general aspect, a system includes at least one processor and memory storing instructions that, when executed by the at least one processor, cause the system to perform any of the operations or methods disclosed herein.

What is claimed is:

1. A computer-implemented method comprising:
receiving, from a requesting process, information identifying a plurality of components of a modular system and information identifying a mechanism for launching the modular system;
generating a current population of startup sequences from the plurality of components, each startup sequence in the current population representing a different sequence of the plurality of components;
generating a respective launch metric for each startup sequence in the current population based on a launch of the modular system via the mechanism;
building a new population, the new population including a subset of the startup sequences in the current population and startup sequences generated from pairs of startup sequences in the current population;
determining a respective launch metric for each startup sequence in the new population;
determining whether the new population includes a particular startup sequence with a launch metric that satisfies an optimization criterion; and
responsive to determining the new population includes a launch metric satisfying the optimization criterion, returning the particular startup sequence to the requesting process.

2. The method of claim 1, wherein the new population includes mutations of at least some of the subset of the startup sequences from the current population or mutations of at least some of the startup sequences generated from pairs of startup sequences in the current population.

3. The method of claim 1, wherein the subset of the startup sequences make up a predetermined percentage of the new population and the startup sequences generated from pairs in the current population make up a remaining percentage of the new population, the predetermined percentage being smaller than the remaining percentage.

4. The method of claim 1, wherein the startup sequences generated from pairs in the current population are generated by crossover between the pairs, each generated startup sequence being validated before being added to the new population.

5. The method of claim 4, wherein a startup sequence is valid when it includes one reference to each component of the plurality of components.

6. The method of claim 1, wherein the number of members in the current population is based on the number of components in the plurality of components.

7. The method of claim 1, wherein the launch metric for a startup sequence includes information from which to determine a startup time for the startup sequence.

8. The method of claim 7, wherein the launch metric further includes information from which to determine a ready time for each component, the ready time for a component representing a time at which the component is ready to process requests.

9. The method of claim 8, wherein the startup sequences generated from pairs in the current population are generated by crossover between the pairs and each startup sequence generated from a pair is validated using the ready time before being added to the new population, wherein validation includes ensuring that a component with an earlier ready time appears ahead of a component with a later ready time in the startup sequence.

10. The method of claim 9, wherein the method includes building a partial dependency graph based on the ready times and the startup sequences generated from pairs in the current population are validated using the partial dependency graph.

11. The method of claim 1, wherein determining whether the new population includes the particular startup sequence includes determining whether a startup time for a most fit startup sequence in the current population is within a threshold of a startup time for the most fit startup sequence in the new population.

12. The method of claim 1, wherein determining whether the new population includes the particular startup sequence includes determining whether a startup time for the most fit startup sequence in the new population satisfies a predetermined threshold.

13. A computer program product for generating an efficient startup sequence for a plurality of components of modular system, the computer program product being tangibly embodied on a non-transitory computer-readable storage medium and comprising instructions that, when executed by at least one computing device, are configured to cause the at least one computing device to:
receive, from a requesting process, an indication of the plurality of components of the modular system and an indication of a mechanism for launching the modular system;
invoke a machine-learning ordering tool to generate at least one startup sequence, the at least one startup sequence being returned with corresponding launch metrics;
determine, based on launch metrics for the at least one startup sequence, whether an efficient startup sequence with a respective launch metric that satisfies an optimization criterion has been identified;
responsive to the efficient sequence being identified, return the efficient startup sequence, wherein the modular system is launched using the efficient startup sequence; and
responsive to failing to identify the efficient sequence, repeat the invoking and determining.

14. The computer program product of claim 13, wherein the launch metric includes a startup time for the modular system and, for each component, a ready time indicating when the component completed loading.

15. The computer program product of claim 13, wherein the instructions are further configured to cause the at least one computing device to select the machine-learning ordering tool from a library of machine-learning ordering tools.

16. The computer program product of claim 15, wherein the library includes a genetic algorithm based ordering tool, a tree search based ordering tool or a neural network based ordering tool.

17. The computer program product of claim 15, wherein the selection is based on a domain of the modular system.

18. A method comprising:
receiving a plurality of components of a modular system, an initial startup sequence, and a mechanism for launching the modular system;
launching the modular system using the initial startup sequence to generate launch metrics;
generating a search tree based on domain knowledge, the initial startup sequence, and the launch metrics, each leaf of the search tree representing an individual startup sequence;
performing a heuristic search of the search tree to obtain a potential startup sequence;
determining whether the launch metric for the initial sequence is within a threshold of the launch metric for the potential startup sequence;
responsive to the launch metric being within the threshold, returning the potential startup sequence; and
responsive to the launch metric being outside the threshold, repeating the generating, performing, and determining using the potential startup sequence as the initial startup sequence.

19. The method of claim 18, wherein the launch metric includes information from which a startup time for the modular system can be determined.

20. The method of claim 18, wherein the launch metric includes a startup time for the modular system and, for each component, a ready time indicating when the component completed loading.

* * * * *